(12) United States Patent
Brugger

(10) Patent No.: US 11,267,011 B2
(45) Date of Patent: Mar. 8, 2022

(54) DISPENSER FOR DISPENSING LIQUID OR PASTY SUBSTANCES

(71) Applicant: Gerhard Brugger, Pflach (AT)

(72) Inventor: Gerhard Brugger, Pflach (AT)

(73) Assignee: DUAL DISPENSERS GMBH, Pflach (AT)

( * ) Notice: Subject to any disclaimer, the term of this patent is extended or adjusted under 35 U.S.C. 154(b) by 719 days.

(21) Appl. No.: 16/076,080

(22) PCT Filed: Feb. 28, 2017

(86) PCT No.: PCT/EP2017/054548
§ 371 (c)(1),
(2) Date: Aug. 7, 2018

(87) PCT Pub. No.: WO2017/153199
PCT Pub. Date: Sep. 14, 2017

(65) Prior Publication Data
US 2021/0031224 A1   Feb. 4, 2021

(30) Foreign Application Priority Data

Mar. 8, 2016 (DE) .................... 10 2016 104 190.4
Feb. 28, 2017 (WO) ................. PCT/EP2017/054548

(51) Int. Cl.
| | |
|---|---|
| *B05B 9/08* | (2006.01) |
| *B05B 11/00* | (2006.01) |
| *B05B 11/04* | (2006.01) |
| *B05B 12/14* | (2006.01) |
| *B65D 83/68* | (2006.01) |
| *G05D 11/00* | (2006.01) |

(52) U.S. Cl.
CPC ........ *B05B 12/1445* (2013.01); *B05B 9/0866* (2013.01); *B05B 11/0078* (2013.01); *B05B 11/048* (2013.01); *B65D 83/682* (2013.01); *G05D 11/005* (2013.01)

(58) Field of Classification Search
CPC .............. B05B 12/1445; B05B 9/0866; B05B 11/0078; B05B 11/048; B65D 83/682; G05D 11/005; G05D 11/006
See application file for complete search history.

(56) References Cited

U.S. PATENT DOCUMENTS

| | | | | |
|---|---|---|---|---|
| 4,090,262 A | * | 5/1978 | Schneider ............ | G05D 11/005 366/155.1 |
| 4,767,033 A | * | 8/1988 | Gemperle ........... | B05B 11/3057 222/383.2 |
| 4,790,454 A | * | 12/1988 | Clark ..................... | B67D 7/741 222/136 |
| 4,924,900 A | | 5/1990 | Taube, Sr. et al. | |

(Continued)

FOREIGN PATENT DOCUMENTS

| | | |
|---|---|---|
| DE | 696 25 096 T2 | 5/2003 |
| DE | 10 2008 001 312 A1 | 10/2009 |

(Continued)

*Primary Examiner* — Frederick C Nicolas
(74) *Attorney, Agent, or Firm* — Renner, Kenner, Greive, Bobak, Taylor & Weber

(57) ABSTRACT

In a dispenser for dispensing at least two liquid or pasty substances from receptacles to a dispenser head, constant delivery pumps are connected therebetween to compensate for viscosity variations and keep a given mixing ratio constant.

20 Claims, 9 Drawing Sheets

(56) References Cited

U.S. PATENT DOCUMENTS

| | | | |
|---|---|---|---|
| 5,388,761 A * | 2/1995 | Langeman | B01F 15/00285 |
| | | | 222/138 |
| 8,224,481 B2 * | 7/2012 | Bylsma | B01F 13/1066 |
| | | | 700/239 |
| 9,346,069 B2 | 5/2016 | Holzmann | |
| 2004/0022067 A1 * | 2/2004 | Taniuchi | F21S 41/321 |
| | | | 362/517 |
| 2014/0061240 A1 | 3/2014 | Gabrielson et al. | |
| 2015/0036454 A1 * | 2/2015 | Vosskuhl | B05B 12/1445 |
| | | | 366/152.2 |
| 2016/0001243 A1 * | 1/2016 | Waizenauer | B01F 15/026 |
| | | | 366/151.1 |
| 2016/0280449 A1 | 9/2016 | Mekata et al. | |

FOREIGN PATENT DOCUMENTS

| WO | WO 2008/112737 A1 | 9/2008 |
|---|---|---|
| WO | WO 2013/104771 A1 | 7/2013 |

* cited by examiner

Fig. 1
Fig. 2
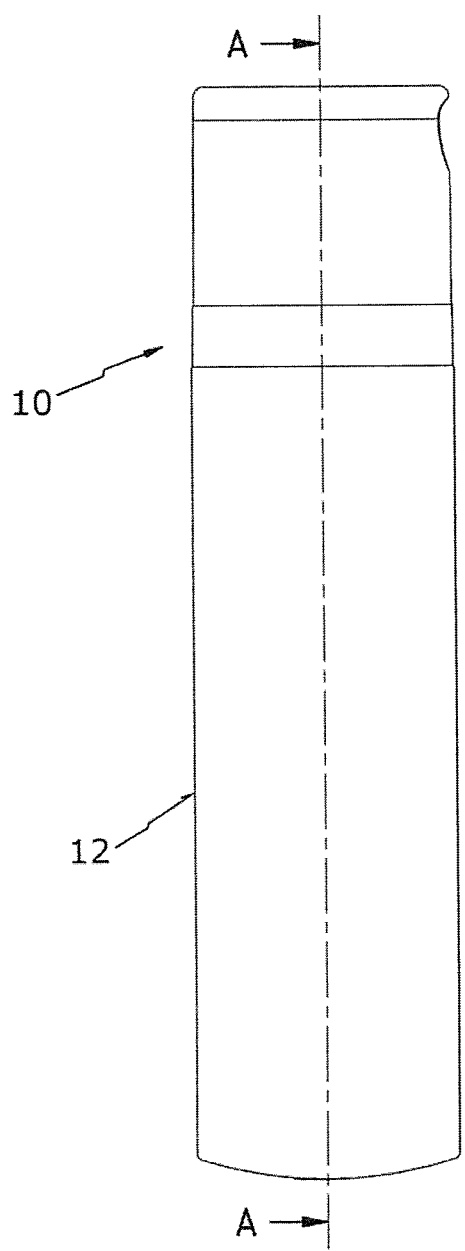
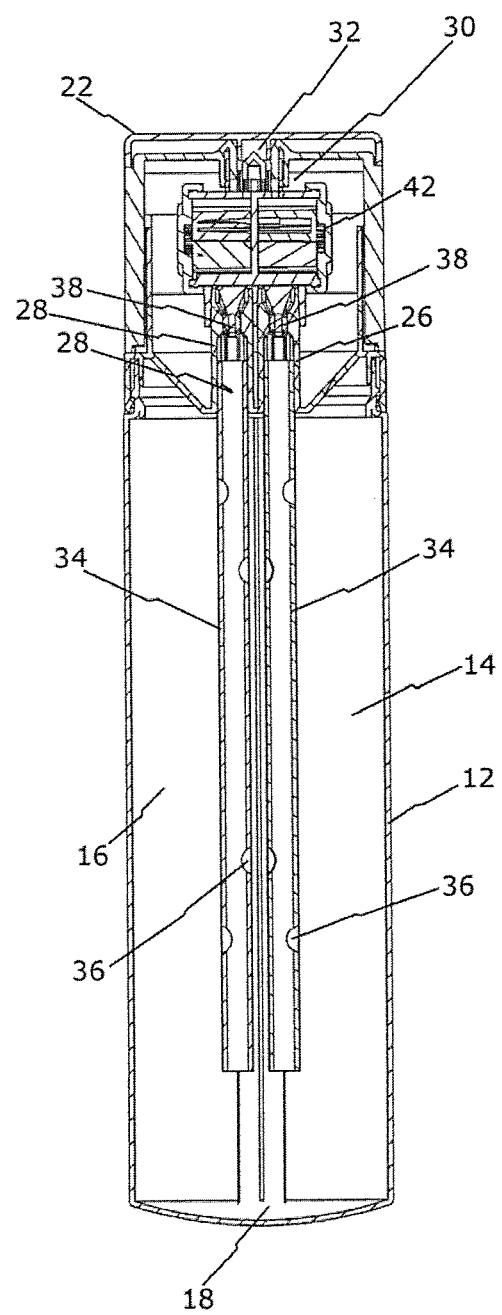

Fig. 3
Fig. 4
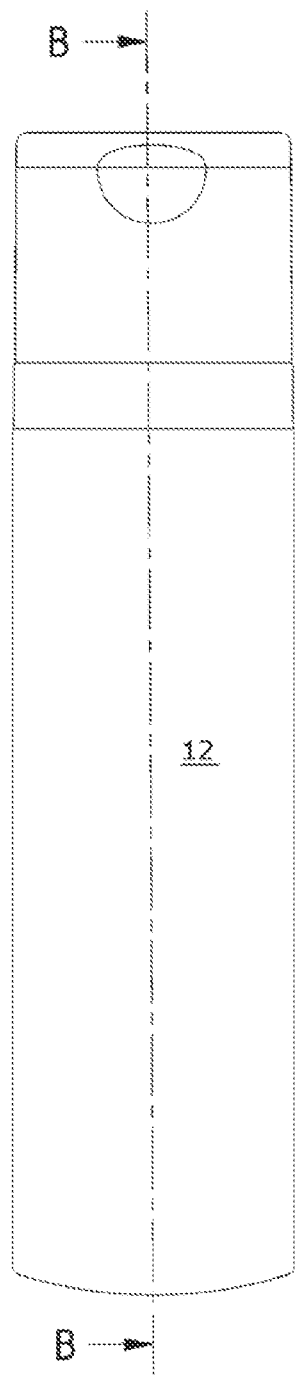
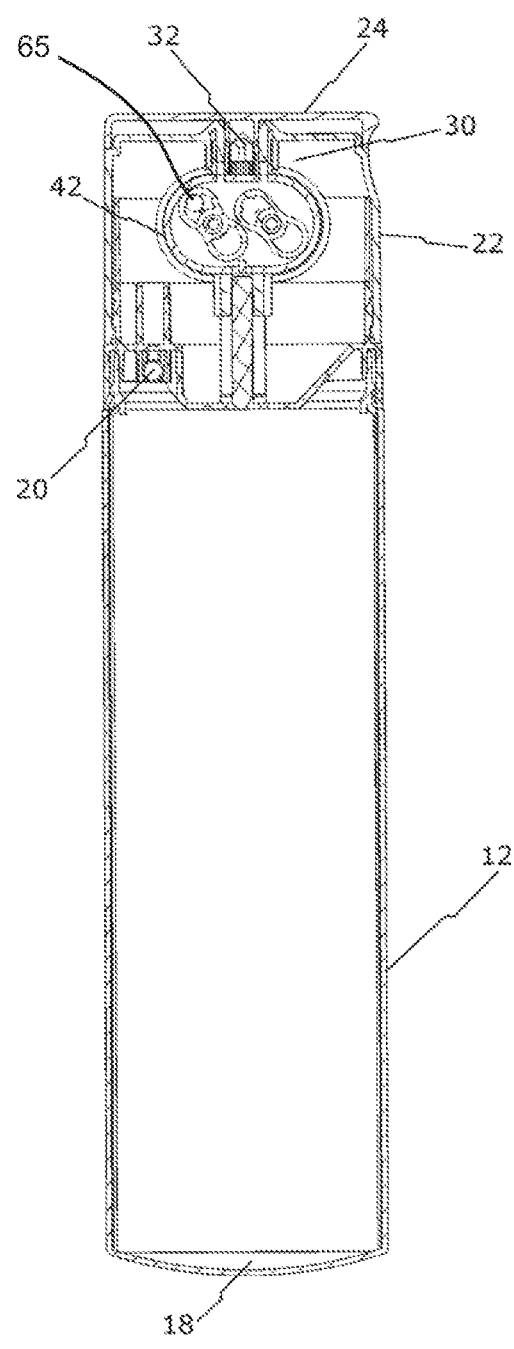

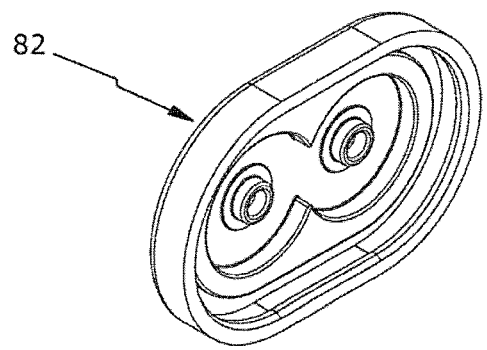
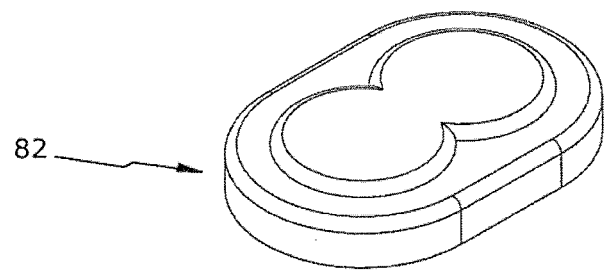
Fig. 12
Fig. 13
Fig. 14
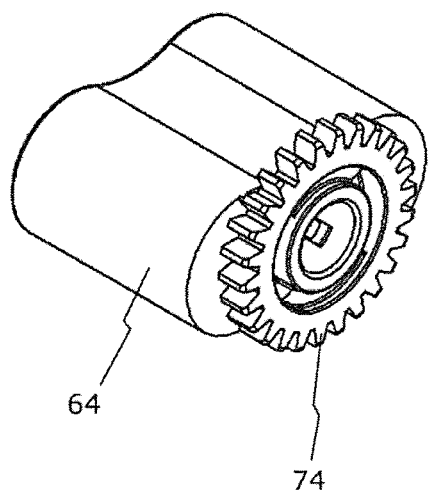
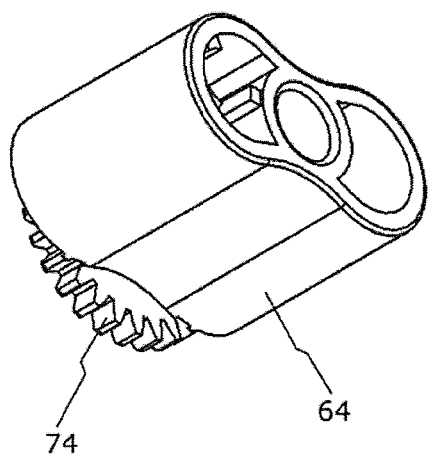

DISPENSER FOR DISPENSING LIQUID OR PASTY SUBSTANCES

The invention relates to a dispenser for substances in particular liquid or pasty substances according to the preamble of claim 1.

BACKGROUND OF THE INVENTION

Dispensers of this type are known in the art, thus from WO 2015/128092 A1. This document describes a dispenser for dispensing substances thus in particular for dispensing 2 substances wherein each substance is received in a flexible container, in particular a foil bag and in which both foil bags are received in a housing with flexible side walls made from plastic material. Each bag includes a dispensing tube which leads into the funnel shaped dispensing opening which leads to a dispensing head, an applicator for dispensing the substances. The substances can be mixed with each other already in the dispensing head at a predetermined mixing ratio or they can be dispensed separately from each other through 2 nozzles or corresponding dispensing openings from the dispensing head or applicator where they are then mixed with each other directly where they are being used. Dispensers of this type are typically used for coating materials. In particular for glues, hair dyes, pharmaceutical products, cosmetic products or similar where 2 or several different materials have to be mixed in order to achieved advantageously technical effects.

In this generic dispenser the housing receiving the 2 foil bags has an approximately oval cross section so that the dispenser can be easily grabbed by hand. The substances are dispensed and mixed eventually by manual pressure on the flexible side walls by the hand grabbing the housing, wherein the hand manually applies pressure to the flexible housing which pressurizes the foil bags and runs the material through dispensing openings to the dispensing head so that the materials are mixed and dispensed.

Alternatively also dispensers are known where the substances are dispensed by pressurizing the containers with the housing internally receiving the substances e.g. by a pressurized fluid in particular a propellant gas. The dispensing is then performed by a respective pressure on nozzle shaped dispensing openings which opens corresponding valve units and wherein the positive pressure in the interior of the housing pressurizes the containers filled with the substances so that the substances are run through the dispensing openings to the applicator as known e.g. from DE 20 2010 018 319 U1 or WO 2011/067868 A1.

Corresponding dispensers with different applications are known from US 2012 007 6930 A1, U.S. Pat. No. 7,537,139 B2 or DE 20 2012 00466 U1 which also describes a dispenser for at least 2 substances which are dispensed by an applicator.

The generic art which is in particular represented by WO 2015 12 8092 A1 or DE 20 2010 018 319 U1 and whose general configuration is also used by the invention so that these documents are incorporated by reference dispenses the substances depending on the configuration of the dispenser in a predetermined mixing ratio which is respectively tailored to the materials to be dispensed and the specific application. Generally the 2 substances are dispensed with a mixing ratio of 50:50 wherein however depending on the configuration of the dispenser also different mixing ratios can be run depending on the application. However it is required that for the desired technical effect that the predetermined mixing ratio is maintained substantially precisely by mixing the substances. The inventor has found that this constitutes a problem in the prior art because the viscosity of the first material or of the second material or of both materials can be different depending on filling charges which has the effect that viscosity variations eventually cause the predetermined mixing ratio not to be maintained which degrades the results. For example in a hair dye where hydrogen peroxide is typically the first substance and a colorant the second substance then even small variations in viscosity can lead to different color effects which can lead to an undesirable blue shine in hair even when there are only minor viscosity variations when a black coloration is desired which can have negative effects upon the sale of the dispensers.

In the art there are different embodiments for the dispensing head, wherein applicators according to WO 2014/11 855 55A1 have proven useful which are also suitable to be used as applicators according to the invention without limiting the spirit and scope of the invention.

BRIEF SUMMARY OF THE INVENTION

Thus it is an object of the invention to provide a dispenser for dispensing liquid or pasty in particular viscous substances so that it is assured in particular for viscosity variations of the substances to be dispensed, that the predetermined mixing ratio of the substances is precisely maintained so that the operations of the dispenser are independent from viscosity variations and viscosity differences.

The object is achieved according to the invention by the features included in the charactering portion of claim 1. Advantageous embodiments of the invention are defined by the features of the dependent claims.

The dispenser according to the invention can improve upon the most pertinent prior art WO 2015 12 8092 A1 or e.g. DE 20 2010 018 319 U1 without limiting the spirit and scope of the invention and cause the dispensing of the substances either under manual pressure on a housing in particular configured with flexible side walls or through a pressurized fluid that is arranged in an interior of the housing so that the substances are dispensed respectively pressure loading of the containers arranged in the housing. According to the invention a constant amount pump is connected between the dispensing openings of the containers arranged in the housing and in the subsequent dispensing head, in particular the applicator wherein the constant amount pump provides that an exact volume of the desired amount is dispensed to the dispensing head according to the predetermined mixing ratio so that the desired mixing ratio can be maintained independently from the viscosity variations of one or plural of the substances to the be dispensed. By interconnecting constant amount pumps of this type constant flow through volumes in particular flow through values corresponding to the predetermined mixing ratio are dispensed independently from viscosity variation which can occur batch specific during production in order to dispense the substances.

Thus it is advantageously that between each dispensing opening and the dispensing head e.g. an applicator as they are used in the generic art a respective constant amount pump for a constant volume flow for each substance is provided, in particular connected there between. Also constant amount pumps are within the scope of the invention wherein the constant feed volume is adjustable in a suitable manner by corresponding adjustment mechanisms.

In a particularly advantageous manner in the general application when dispensing 2 substances from 2 containers that are arranged within a housing 2 constant amount pumps are being used which are being coupled with each other so that both constant travel pumps respectively provide a predetermined volume flow of the substances according to the intended mixing ratio.

According to the invention it is advantageous to receive the plural containers in a dispenser housing, wherein the dispensing of the substances is provided either by manual pressure loading through the dispenser housing on at least one of the containers received in the dispenser and/or by a propellant fluid arranged in the dispenser housing or in a container that loads at least one of the containers or the substance included therein for dispensing the substance. However a container dispenser housing is not mandatory rather two containers can be provided that are respectively pressure loadable by a propellant fluid wherein the containers are only connected with each other by a foil. Since it suffices due to the permanent coupling of the constant amount pumps, thus in case of 2 containers with 2 constant amount pumps to feed substance under pressure to one constant amount pump which suffices since so that due to the speed coupling the other constant amount pumps pull the substances from the other containers, also without separate pressure loading so that they are dispensed. Therefore it suffices for example that only one of the plural containers is pressure loaded whereas the other containers can be configured completely independently from a criterion of pressure loaded dispensing of the substances. For example it suffices in the case of 2 containers that the substance is dispensed from one container under pressure, for example by manual pressure in that the container wall is flexible or due to propellant fluid dispensing of a substance whereas the other container can be arranged as a simple container at the first container. This provides the option that the dispenser in case of pressure containers with typical cylindrical containers as a consequence of coupling the additional container can get a cross sectional shape with a more esthetic design so that the looks of the dispenser overall become more pleasant.

Furthermore it is advantageous that the constant amount pump is respectively arranged in the pressure loaded containers with in the pressure vessel, thus as close as possible e.g. to a flexible bag that is received in the pressure vessel. In particular the constant amount pumps shall be arranged in front of the pump valves.

This coupling is advantageously provided mechanically but also magnetically and thus in particular permanent magnetically wherein an electromagnetic coupling is also possible as a matter of principle. In particular neodyme magnets are suitable for the mechanical coupling.

Constant pumps for constant flow through measurements of substances, thus constant amount pumps are generally known and can be used in a suitable manner in a context with the invention.

Among these are in particular rotating displacement pumps or volume metric displacement counters which respectively provide a volume metrically predetermined flow through volume independently from viscosity variations.

When using volumetric flow through counters the volume can be captured within a time period so that the volume that shall be dispensed according to the desired mixing ratio can be metered by a respective tapping which is independent from a viscosity of the substance. Therefore these counters are advantageously calibrated to a quantity so that the respective metering can be exactly maintained corresponding to the mixing ratio.

In a particularly advantageous manner mechanical-volumetric flow through measuring. In a particularly simple manner mechanical-volumetric flow through measuring devices are suitable and thus indirect or direct volume counters. For direct volume counters a predetermined volume chamber is connected there between, continuously filled with the substance and emptied accordingly. In particular however displacement counters are suitable, wherein in particular the measured material, thus the substance is displaced by suitable measuring chamber walls. Displacement counters of this type are suitable in particular for liquids.

In the context of the invention, however, it is advantageous in particular to use rotating displacement pumps which facilitate exact metering independently from viscosity variations in a simple manner. Thus in particular known rotating piston pumps, rotating disc pumps, vein pumps or gear pumps are suitable for the invention. Thus however it is within the spirit and scope of the invention that both pumps are used in a dispenser, thus displacement pumps and volumetric counters.

The pumps can be produced in a simple manner in miniaturized form, in particular from plastic material by injection molding or similar so that pumps of this type are particularly suitable for dispensers. In particular displacement pumps can be arranged in a simple manner in small housings wherein according to the invention 2 pumps are advantageously coupled together and arranged in a housing when 2 substances are dispensed. Thus however the volume flows are separated from each other until they enter the pump and until they leave the pump. Only after the pump exit advantageously both volume flows of the 2 substances are joined so that they are mixed in the dispensing head, otherwise the 2 substances are run to the dispensing head separate from each other and dispensed wherein they are then mixed automatically e.g. in the immediate application, thus when applied to hair.

Another advantage of the intermediate connection of the constant amount pumps is also provided in that typically only one of the containers has to be pressure loaded for dispensing the substances under pressure since the mechanical or magnetic, in particular permanent magnetic coupling of the pumps' amongst each other rotors of the other pump co rotate when a pump is loaded with the substance from the container and thus the other pump is placed into suction position and substance is pulled from the other container also without particular pressure loading and dispensed. Also this is a particular advantage in the context of the measures according to the invention.

It is generally appreciated that all commercially available dispensers for cosmetics, glues and similar that mix 2 or more components are retro fit able within the scope of the invention using the measures according to the invention so that problems are solved where an exact metering of the substances cannot be maintained due to variations in the viscosity. Thus the invention is suitable in particular for configurations improving upon the most proximal prior art, but also for other dispenser types improving upon another of the printed documents recited supra. For example a container with pressure loaded substance dispensing suffices and the other container can be configured in any suitable manner and connected in any suitable manner. For example a dispenser housing made from plastic material with a divider chamber suffices, wherein a pressure dispensable substance is only arranged in one of the 2 chambers thus dispensable through a flexible actuation or propellant fluid wherein the other chamber due to the suction effect during pump actuation can only be configured as a pure receiving container.

Constant amount pumps according to the invention are pumps which facilitate a precise volumetric metering of a pump volume. In case of counters, in particular volume metric displacement counters, oval wheel counters, rotating piston gas counters, wobble disc counters, ring piston counters or gear counters are suitable.

In particular rotating piston pumps, rotating vane pumps, rotary piston pumps or gear pumps or similar rotating mechanical pumps like e.g. also pumps according to the Wankel principle are suitable.

According to the invention the housing of the dispenser can include 2 or plural containers and thus 2 or more dispensing openings which lead to the dispensing head, wherein 2 or more constant amount pumps are used in the dispenser wherein the constant amount pumps are advantageously arranged in a common pump housing. Thus the individual pumps however are arranged separated from each other by a respective divider wall in individual pump chambers that are separated from each other by divider walls. In case of 2 containers in the housing the pump housing includes an advantageously central divider wall which divides in 2 pump chambers.

Thus it is advantageous that each pump chamber is connected with a dispensing opening of a corresponding container. The term "housing" has a broad interpretation according to the invention. Among them is any structure which hold 2 or plural containers, together, for example a foil envelope or similar. In each pump chamber advantageously respective constant amount pumps, advantageously with the same configuration, are arranged which however is not mandatory and a mix of both pump principles can be useful, in particular for example when a liquid and a pasty substance is used.

In an advantageous embodiment of the invention the constant amount pump is formed by a rotor, in particular with one or plural rotor blades which respectively define a suction chamber and a dispensing chamber during a revolution. In particular, however, it is advantageous that each pump chamber includes at least one advantageously however two rotors that mesh with each other wherein each rotor is provided with a rotor blade. Advantageously also several rotor blade can be provided as required.

In displacement pumps of this type, in particular two rotor blades that communicate with each other are in sealing/sliding contact on the one hand side with an inner wall of the pump housing during the rotor revolution, but also the 2 rotor blades amongst each other so that a continuing rotation of the rotors pulls in the substance and eventually feeds the substance to the dispensing opening of the pump housing. Thus it is sufficient that one of the substances is fed into the pump housing under pressure since this forces the rotors to rotate self-acting. Due to the mechanical coupling also the rotors in the other pump chamber are driven accordingly by at least one respective rotor in each pump chamber so that substances can also be dispensed without pressure loading of the container that is connected through the respective dispensing opening so that the substances can be pulled from the container and dispensed to the dispensing head.

In any case it is advantageous in the context of the instant invention that the constant amount pumps are driven by the coupling of the rotors of adjacent chambers so that no motor drive and similar for the pumps is required.

In case of two containers which is an advantageous embodiment of the dispenser each of the two pump chambers includes a tubular inlet spout that communicates with the dispensing opening of the container wherein the tubular inlet spout leads to the corresponding pump chamber. On the outlet side it is advantageous to only provide one tubular spout for both pump chambers. Through this tubular spout both volume flows can be exhausted together so that a mixing of the 2 substances is performed behind the pump. However it is also advantageous that the outgaining tubular spout is divided as required by a divider wall, optionally an annular wall, so that the 2 volume flows can be fed to the dispensing head separately from each other. The mixing can thus be performed in the outlet or during outleting from the dispensing head or the applicator.

In a particularly advantageous manner a meshing rotor pair with corresponding rotor veins is provide din each pump chamber wherein the rotor veins cooperate so that a respective chamber for receiving the substance is formed and thus the substance fed from the container inlet opening is sealed according to the typical pump principle to the output side for dispensing through the outlet opening. Thus it is advantageous that both rotors respectively mesh with each other which is advantageously provided by corresponding gears that are provided at the rotors. If required, the vanes can also be provided in gear shape corresponding to the pump principle. Advantageously at least one rotor in each pump chamber is coupled with another rotor which can be performed advantageously mechanically or magnetically, in particular electromagnetically.

Furthermore it is advantageous to support an axle shaft in the divider wall, wherein the rotors can then be coupled accordingly through the divider wall. Instead of a mechanical axle shaft however also a magnetic coupling is required wherein the axle shaft can then be omitted and the corresponding rotors are respectively arranged on an axle stub or an axle journal which respectively protrudes into the corresponding pump chamber from the divider wall. Rotors of each pump chamber that are not coupled with the rotors of the other pump chamber are advantageously also supported on axle stubs or axel pins that are in particular configured hollow. Based on this embodiment the pump can be assembled in a very simple manner from injection molded plastic components wherein the interconnection of the components can be advantageously profiled by a plug in and/or clip connection.

In case of a mechanical coupling of the rotors the rotors are respectively arranged torque proof on the corresponding shaft so that a rotation of a first rotor forces a second rotor in the other pump chamber to rotate along. Advantageously the principle described supra can be respectively applied for 2 meshing rotors in a pump chamber as well as for rotors for more than 2 pump chambers, wherein respective divider walls separate the pump housing into the corresponding pump chambers in which the corresponding volume pump is arranged.

BRIEF DESCRIPTION OF THE FIGURES

Advantageously embodiment of the invention are subsequently described with reference to drawing figures:

FIG. 1 illustrates a side view of an embodiment of a dispenser;

FIG. 2 illustrates a sectional view along the line A-A of FIG. 1;

FIG. 3 illustrates a 90° rotated side view of the dispenser according to FIG. 1;

FIG. 4 illustrates a sectional view along the line B-B in FIG. 3;

FIG. 12 illustrates two perspective views of an identical cover that is useable for closing the pump chamber of pump housing;

FIG. 13 illustrates a view of a rotor for an application of the pump recited supra in a perspective view;

FIG. 14 illustrates a view of the rotor according to FIG. 13 in a perspective view, however from another side.

DETAILED DESCRIPTION OF THE INVENTION

Figure 5:
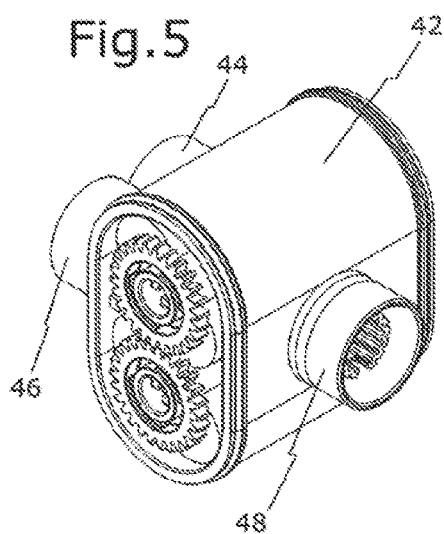
FIG. 5 illustrates a perspective view of an advantageous embodiment of a pump housing that is useable in a dispenser.

The invention is subsequently described based on an advantageous embodiment for a dispenser in a basic configuration according to the dispenser according to WO 2015/12 8092 A1. The core idea of the invention, that is an intermediary connection of constant amount pumps is useable analogously also in other pumps with other configurations.

Thus the features described in a context with the invention for this dispenser are also disclosed in other embodiments of dispensers so that independent patent protection is claimed for the described features since the features are by themselves independent from the context in which they are subsequently described and certainly also useable for other configurations of dispensers, this means they can be used by themselves. Thus these features are generalizing features.

FIGS. 1 and 2 illustrate outside views of a dispenser 10 that are rotated relative to each other by 90° in a configuration in order to describe the invention based on an exemplary embodiment, thus a dispenser with a basic structure according to WO 2015/12 8092 A1 which is thus included explicitly wherein however the invention is also useable for other corresponding dispensers which are referred to in an exemplary manner in an introduction of the description with reference to printed documents. Due to a configuration identity with the embodiments of FIGS. 1-10 of WO 2015/12 8092 A1 the dispenser can be subsequently described in general.

The dispenser 10 includes a dispenser housing 12 which forms the outer wall of the dispenser housing 12 and which is in particular configured easily deformable and which can be easily gripped and pressed by a human hand. In the housing 12, two (not limiting) containers 14 and 16 are arranged in this embodiment accordingly for dispensing two substances wherein the containers are deformable under pressure and can be configured in particular as bags. Between the containers there is an intermediary space 18 which can be filled with ambient air through a known compensation valve in an upper portion of the dispenser, in particular above the tow containers 14, 16. The container 10 thus advantageously includes a clip on cover element 22 with a flip cover 24 which however is an exemplary embodiment but other embodiments can be used by the same token. The cover element 22 with the clip cover 24 also covers the ventilation hole of the intermediary space 18 in a closed position.

FIG. 2 illustrates the advantageously spout shaped dispensing openings 26 and 28 which communicate each by themselves with the containers 14 and 16 in which the viscous substances which are to be dispensed and mixed are received. The two spout shaped dispensing openings 26 and 28 lead to the dispensing head 30 which is closed by the cover element 22 and which includes an exit nozzle 32 that is analogous to the prior art which is subsequently described in an exemplary manner and which can essentially be identical to the generic art according to WO 2015/12 80 92. This exit nozzle can be configured also e.g. as described in WO 2014 18 055 A1, therein however with the application ball. The configuration of this exit nozzle is however included since this exit nozzle is quite suitable.

FIG. 2 furthermore illustrates two tubes 34 that lead to the dispensing openings 26, 28 and which are coupled together. The tubes 34 can be provided with openings 36 and they are used in particular for stabilizing the containers 14, 16 configured as flexible containers in particular balls. The tubes 34 are in communicating connection with the dispensing openings 26, 28 in order to feed the substances to the dispensing head 30 which can be forced by manual compression of the dispenser housing 12. Thus the substance is run from the containers through the tubes 34 to the dispensing openings 26, 28 for dispensing.

Furthermore FIG. 2 schematically indicates filling valves 38 which can be pressed into an open position by corresponding mandrel shaped protrusions which will be subsequently described in a context with the pumps. These protrusion are designated as 40 and known from FIG. 2 as well as e.g. from FIGS. 6 and 8.

Figure 6:
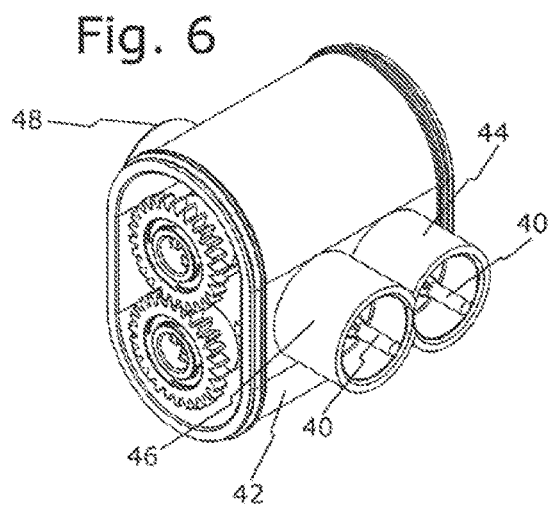
FIG. 6 illustrates a perspective view of the pump housing according to FIG. 5 from the inlet side
Figure 7:
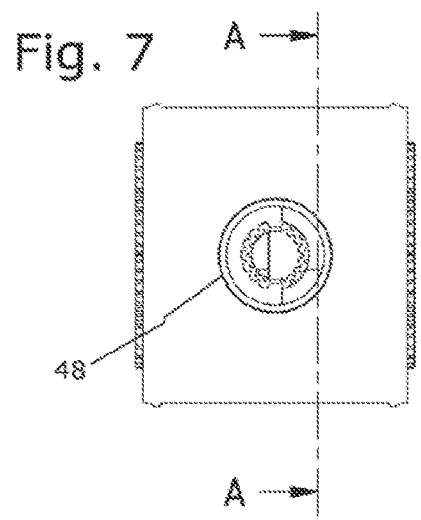
FIG. 7 illustrates a top view of the pump housing according to FIG. 5.

Between the dispensing openings 26, 28 and the dispensing head 30 or the exit nozzle 32 a pump housing 42 is arranged which includes 2 tube supports 44 and 46 on an inlet side and an outlet spout 48 on an outlet side as apparent from in particular from FIGS. 5 and 6. From FIG. 8 but also from FIG. 6 it is evident that the mandrel shaped protrusion protrude beyond the corresponding tubular spouts 44, 46 so that filling the filling valves are pressed into the open position when the pump housing is applied to the dispensing openings 26, 28. In the applied position of the pump housing the tubular spouts 44, 46 communicate with the dispensing opening 26, 28 so that substances can be run from the containers into the pump housing.

Figure 8:
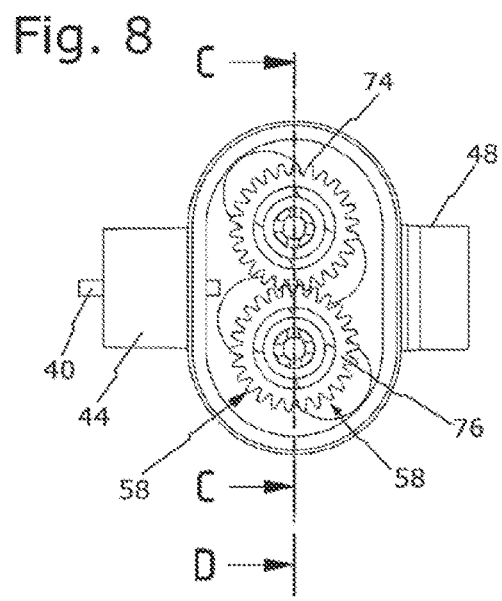
FIG. 8 illustrates a side view of the pump housing according to FIG. 7 with a removed cover.
Figure 9:
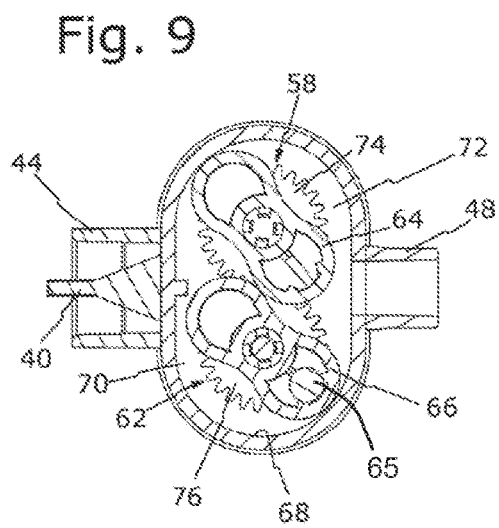
FIG. 9 illustrates a sectional view along the line A-A of FIG. 7.
Figure 10:
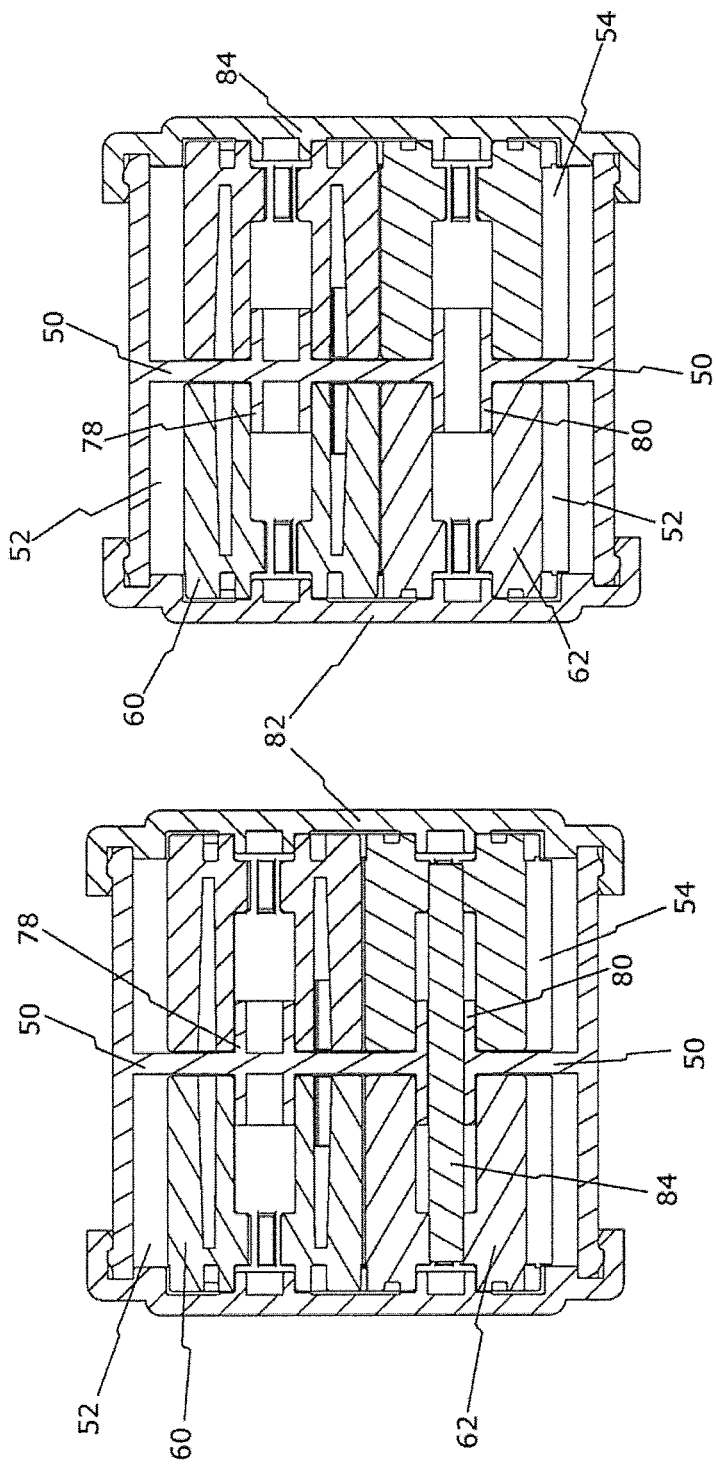
FIG. 10 illustrates a sectional view along the line C-C with a mechanical rotor coupling.
Figure 11:
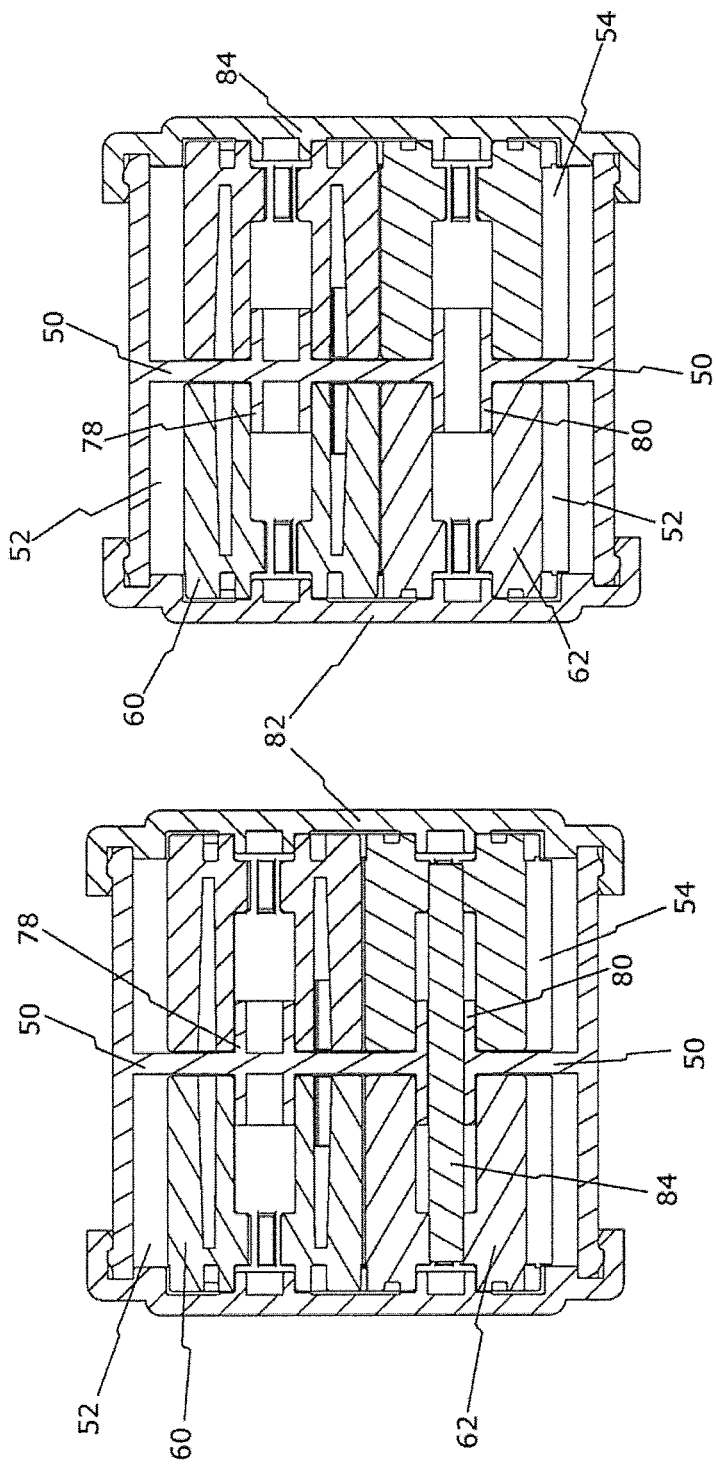
FIG. 11 illustrates a sectional view along the line D-D (analog partial sectional view of FIG. 10 through a pump housing according to FIG. 8 that is suitable for an electromagnetic coupling.
Figure 15:
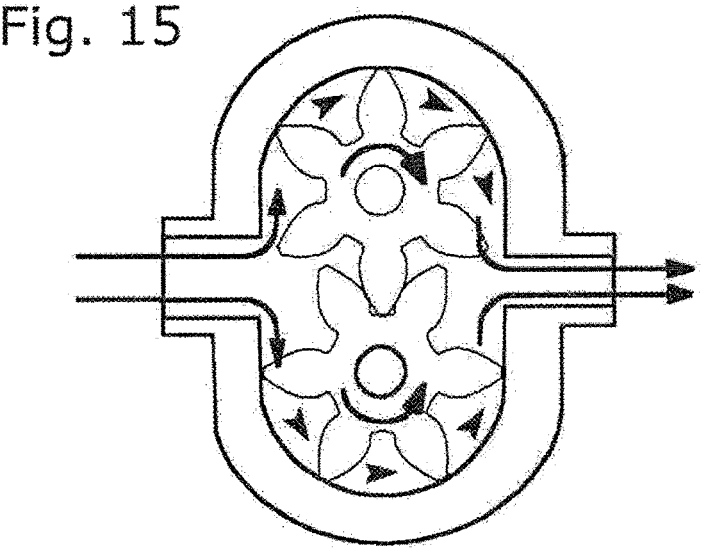
FIGS. 15-19 illustrate schematics of various embodiments of constant amount pumps for an application according to the invention.
Figure 16:
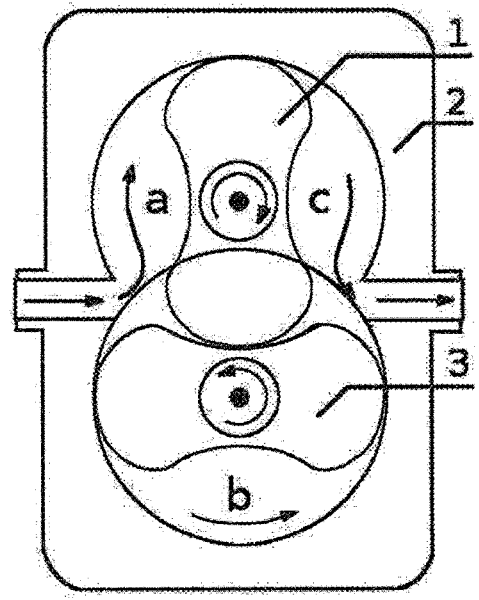
Figure 17:
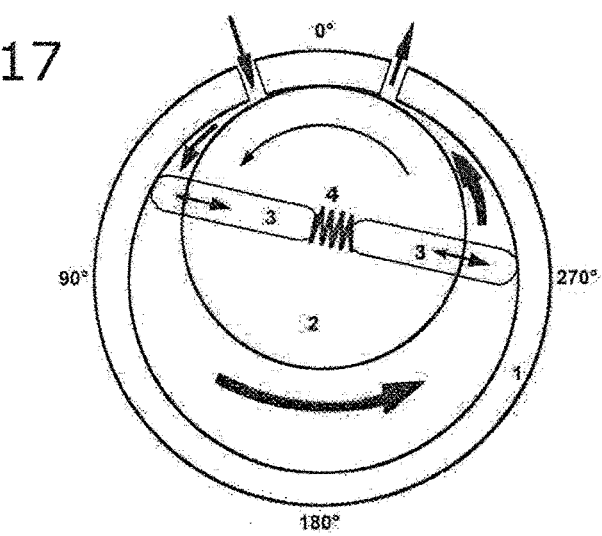
Figure 18:
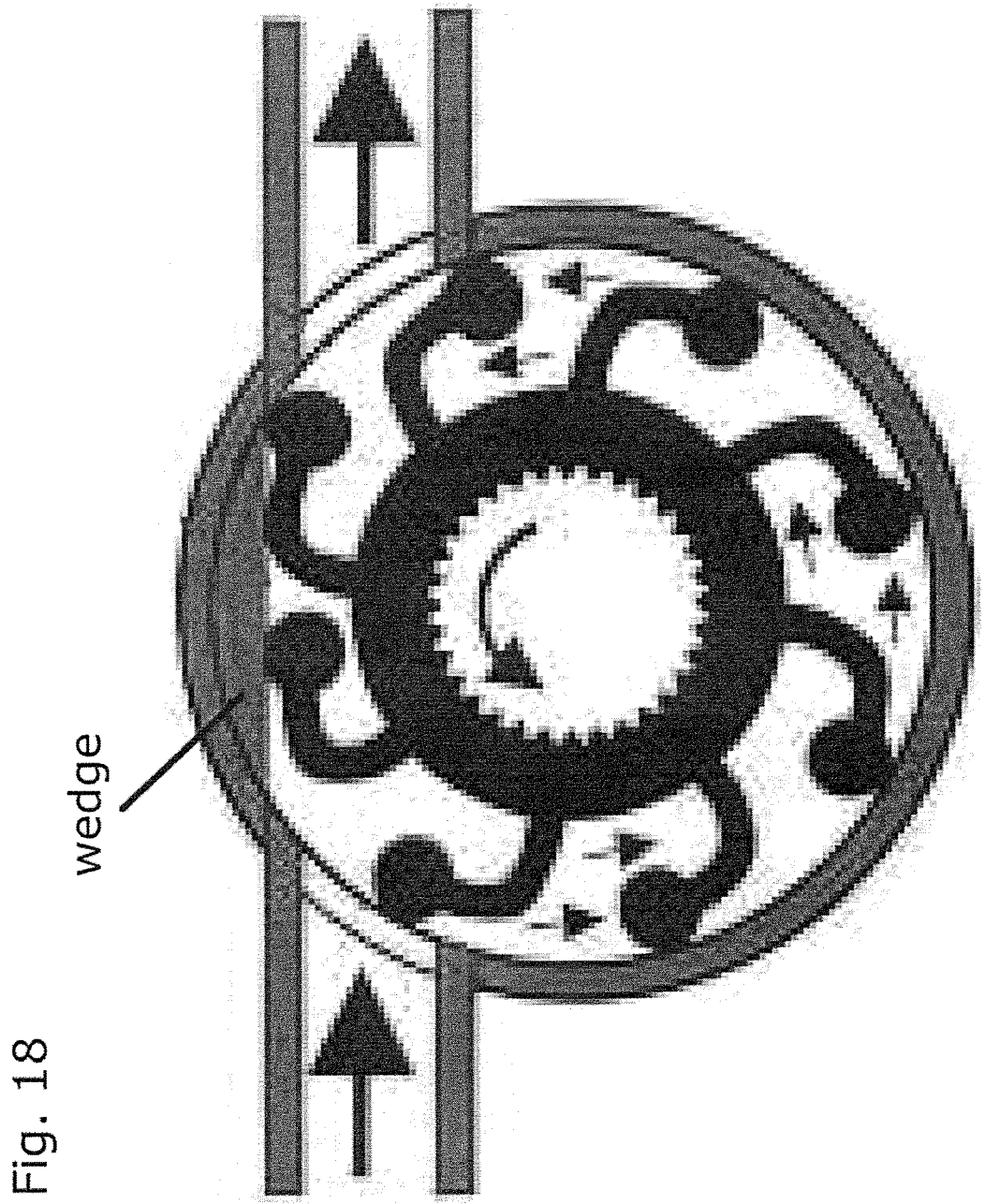
Figure 19:
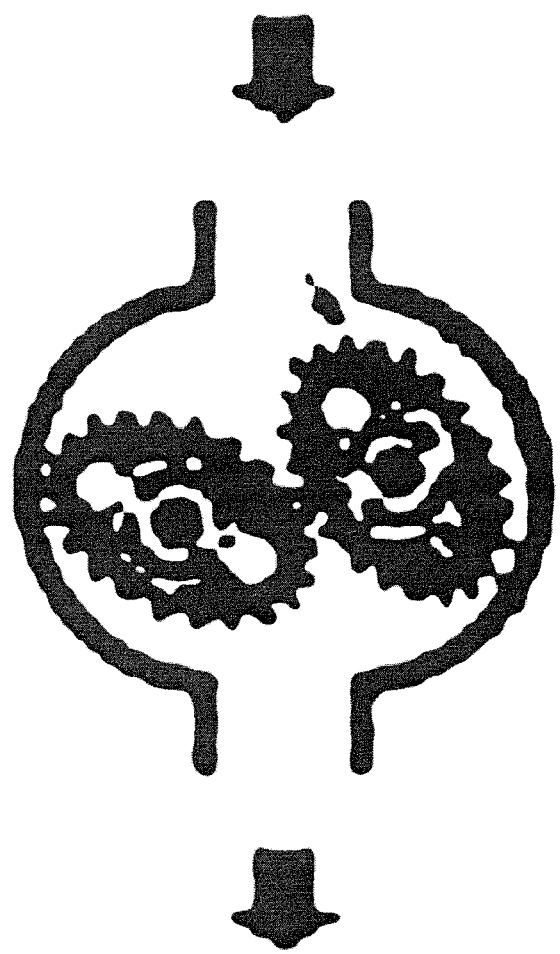

As evident in particular from the sectional view according to FIG. 10 but also from FIG. 11 the pump housing 42 is divided by a divider wall into 2 pump chambers 52 and 54 in which a respective constant amount pump 58 is arrange (FIGS. 8 and 9). In the illustrated exemplary embodiment each constant amount pump 58 is formed by a rotor pair of rotors 60, 62 that mesh with each other (FIGS. 8 and 9).

As evident from FIG. 9 the rotors 60 and 62 include rotor veins 64 and 66 which are in sliding tight contact with each other according to the illustration in FIG. 9 but also always in contact with the inner wall of the pump housing 42 in order to be able to perform pumping so that the receiving chamber or suction chamber designated with reference numeral 70 in FIG. 9 is formed, whereas the fluid separated dispensing chamber 72 is illustrated on the right side. Both chambers are not in fluid conducting connection with each other. The right chamber 72 moves the metered substance through the tubular spout 48 to the dispensing head in the functional position of the rotors of the rotor pair illustrated in FIG. 9. The configuration of the rotor veins 64 and 66 is evident from FIGS. 13 and 14. These FIGS. illustrate gears 74 and 76 that are accordingly associated, in particular integrally formed as a plastic injection molded component wherein the gears are respectively arrange according to FIG. 8 in the respective pump chamber so that they mesh with each other. FIG. 9 also shows permanent magnet 65.

As illustrated in FIG. 10, the individual rotors can be arranged on axle shafts, in particular on hollow journals 78 and 80 of the divider wall 50. Thus the pump housing 42 is advantageously produce able with the tubular spouts and the divider wall together with the axle journals by injection molding integrally in one piece. The two pump cavities can then be laterally closed by suitable COVERS 82 AFTER arranging the rotors as evident from FIGS. 10 and 11 wherein a cover 82 of this type is illustrated in an exemplary manner in FIG. 12.

According to an embodiment that is particularly advantageously in a context of the invention a respective rotor of each rotor pair that are arranged adjacent to each other with respect to the divider wall are coupled with each other so that they can revolve with the same speed. The coupling can be provided mechanically according to FIG. 10. For this purpose the lower axle journal 80 includes a bore hole in which a shaft 84 is rotate ably supported on which the respective rotors 62 are arranged on both sides of the divider wall 50, this means they rotate together with the shaft. This can be achieved in a simple manner by a corresponding fit but also by another typical torque proof clamping. Thus the 2 rotors 62 are mechanically coupled with each other through the shaft 84, thus rotate with identical speed if they rotate at all. The upper rotors 60 are supported freely rotate able in the illustrated embodiment on respective axle journals 78. Thus also the covers 82 can be configured with respective axle journals so that each rotor is also supported freely rotate able on both sides of the cover which is also advantageous for the 2 lower rotors 62.

When substance is fed from the containers through the tube spouts 42 and 46, thus due to pressure loading of the containers manually or through a propellant fluid in an interior of the dispenser housing 12, then the substance respectively penetrates the corresponding receiving chamber, e.g. the chamber 70 according to FIG. 9 and thus drives the rotor received therein which rotate in the same direction with the same speed due to the advantageously 1:1 transmission of the meshing gears 74, 76, thus they are driven to rotate by the fat fed substance. Thus a precise volumetric metering is performed due to the pump dependent constellations thus independently from viscosity variations. Due to the coupling through the shaft 4 with the rotors arranged in the adjacent chamber a rotation of the adjacent rotors is performed in the same direction so that the substance can also be introduced here exactly metered and in particular also expensed exactly metered.

Thus it suffices for operations by itself already that a corresponding substance is run into one of the two chambers due to the pressure loading of only one container, since a suction pressure is generated caused by the force coupling of the rotor 62 of both adjacent pump chambers on the other pump side which pulls the substance from the other container also without pressure loading. The precisely measured amount is then fed through the dispensing opening or the tubular spout 48 to the dispensing head 30 and thus to the applicator. Thus both volume flows can already be joined in the tubular spout 48 and thus mixed according to the desired ratio. Thus also a separate outlet of the volume flows to the dispensing head and there also through separate nozzles provided at this location so that mixing the dispensed substances is only performed when they are applied thus directly when using the substance. This can be performed as required in the respective application. The separation of the 2 volume flows at the output side of the pump can be performed e.g. by a suitable divider wall within the tubular spout 48 or within subsequent fluid conducting components.

Due to this precise metering of the volume flows of the substances, this is completely independent from possible viscosity variations which may be unavoidable on a per batch basis so that a precise metering of the substances can be performed in the intended manner due to the intermediary connection of constant amount pumps.

FIGS. 15-19 illustrate various suitable constant amount pumps that are useable according to the invention. Since these are known pump types a purely exemplary representation suffices. According to the invention advantageously impeller pumps or rotating vane pumps are used.

Due to the measures according to the invention an increased flexibility is achieved in configuring an arrangement of several containers in a metering dispenser. Mostly due to the fact that it is sufficient due to the pump synchronization when substance is fed under pressure to the pump through one of the containers since the other pumps are co actuated due to the coupling of the pumps respectively associated with the individual containers so that the pumps pull substance from the respective containers so that no precautions have to the taken in order to feed substance to a respective pump under pressure.

Figure 20:
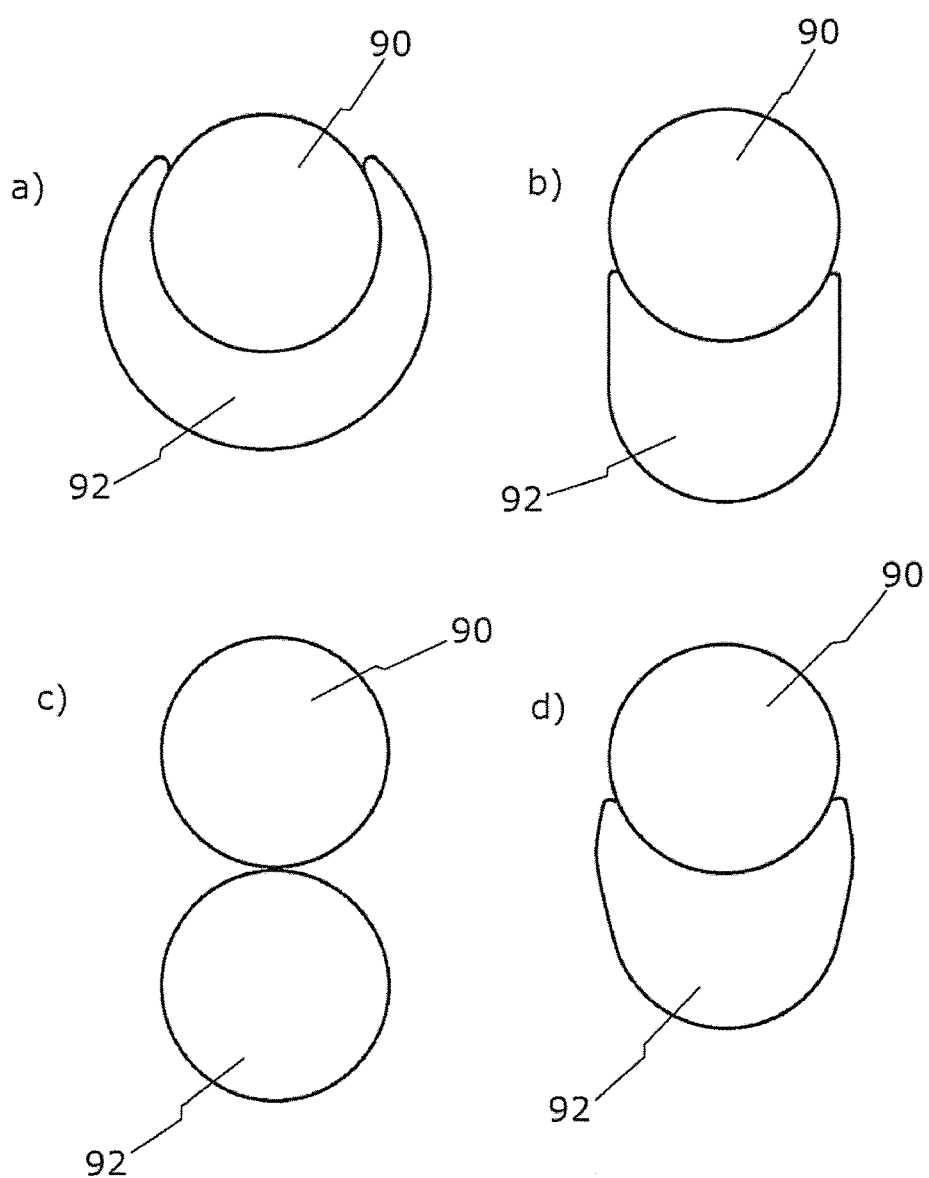
FIG. 20 illustrates a selection of different designs of containers.

In the optional embodiments illustrated in FIG. 20 a container that is respectively loaded with pressure is designated as 90 and the other in principle "no pressure" container is designated as 92, wherein FIG. 20 illustrated 4 alternative embodiments of the dosing dispenser respectively with 2 containers 90 and 92.

In the embodiment according to FIG. 20*a* the "no pressure" container 92 envelops the "pressure loaded" container 90 in a moon cycle shape so that a dosing dispenser with an essentially cylindrical cross section is obtained.

In the embodiment according to FIG. 20*b* the container 92 is applied flush to the container 90. Thus a separate dispenser housing is not required, rather a foil envelopment would suffice in order to fixate both containers. This also applies to all embodiment illustrated in FIG. 20.

FIG. 20*c* shows two pin shaped containers with a cylindrical cross section wherein a simple envelopment for fixing the 2 containers at the dosing dispenser would also suffice.

The same applies for the embodiment according to FIG. 20*d* which is in turn applied flush to the cylindrical container 90.

This yields an overall compact configuration of the metering dispenser for two containers with variable design.

The invention claimed is:

1. A manually grippable and handleable dispenser for dispensing at least two liquid or pasty substances which are dispensable and mixable with each other in a predetermined ratio for dispensing, the dispenser comprising a dispenser housing with at least two flexible containers (14, 16) that are received in the dispenser housing and of which at least one is flexible for separate storing of the substances to be dispensed which are dispensable through a respective dispensing opening (26, 28) to a dispensing head (30), wherein the substance is dispensable from at least one of the containers by pressure loading, wherein the dispensing is performed either by manual pressure loading through the dispenser housing upon at least one of the containers (14, 16) received in the dispenser (10) and/or by a propellant fluid that is arranged in the dispenser housing (12) which loads at least one of the containers to dispense the substance,
characterized in that
a respective constant amount pump (58) is provided between the dispensing openings (26, 28) of the containers (14, 16) and the dispensing head (30) for each substance that is fed through the corresponding dispensing opening, wherein the constant amount pump dispenses an exact amount of the substance to the dispensing head (30) independently from viscosity variations of one or plural substances respectively corresponding to a predetermined mixing ratio and that the constant amount pumps (58) of the individual substances are coupled with each other mechanically and/or magnetically, and wherein either a rotor or a rotor pair (60, 62) are provided in each of a first pump chamber (52) and a second pump chamber (54), and that at least one rotor (62) of the first pump chamber (52) is mechanically and/or magnetically coupled with at least one rotor (62) of the second pump chamber (54).

2. The dispenser according to claim 1,
characterized in that
the constant amount pump (58) for a constant volume flow is provided between each dispensing opening (26, 28) and the dispensing head (30).

3. The dispenser according to claim 1, characterized in that the coupling is performed in a permanent magnetically manner.

4. The dispenser according to claim 1,
characterized in that
rotating displacement pumps and/or volumetric flow through meters are used as the constant amount pumps (58) for the constant flow through of the substances.

5. The dispenser according to claim 4,
characterized in that
rotating piston pumps, rotary vane pumps, rotary piston pumps, or gear pumps are used as rotating displacement pumps.

6. The dispenser according to claim 4,
characterized in that
oval wheel counters, rotating piston gas counters, wobble disc counters, ring piston counters or gear counters are used as volumetric flow through meters.

7. The dispenser according to claim 1,
characterized in that
the dispenser housing (12) includes at least two output openings (26, 28) wherein at least two of the constant amount pumps (58) are provided which are arranged in a common pump housing (42) which includes at least two further pump chambers (70, 72) respectively with each of the at least two constant amount pumps (58).

8. The dispenser according to claim 7,
characterized in that
the pump housing (42) includes two pump chambers that are separated by a divider wall (50) wherein a respective constant amount pump (58) is arranged in each pump chamber, that a dispensing opening (26, 28) opens into each pump chamber (52, 54) wherein the substance is feedable to the pump through the dispensing opening.

9. The dispenser according to claim 7,
characterized in that
an outlet channel is provided on an outlet side of the pump, in particular configured as a tubular spout (48) wherein the outlet channel leads to the dispensing head (30) and in which either both volume flows of both substances are mixed or both volume flows are conductible to the dispensing head (30) separately from each other due to a divider element for dispensing the substances.

10. The dispenser according to claim 1,
characterized in that
each rotor is rotatably supported on an axle (78, 80).

11. The dispenser according to claim 10,
characterized in that
the coupling is provided by a permanent magnet.

12. The dispenser according to claim 10,
characterized in that
the mechanical coupling is performed by a shaft (84) that is rotatably supported in the divider wall (50) or in the pump housing wherein a respective rotor (62) of each pump chamber (52, 54) is arranged on both sides respectively torque proof with the shaft.

13. The dispenser according to claim 10,
characterized in that
the rotors (60, 62) of each pump chamber (52, 54) are supported freely rotatable.

14. The dispenser according to claim 10,
characterized in that
the rotors (60, 62) of each pump chamber (52, 54) are in meshing engagement with each other.

15. The dispenser according to claim 4,
characterized in that
displacement meters are used as the constant amount pumps (58) for the constant flow through of the substances.

16. The dispenser according to claim 14,
characterized in that
the rotors (60, 62) of each pump chamber (52, 54) are in meshing engagement with each other through gears (74, 76) which are arranged at each rotor.

17. The dispenser according to claim 1,
characterized in that
the dispensing head is an applicator.

18. A manually grippable and handleable dispenser for dispensing at least two liquid or pasty substances which are dispensable and mixable with each other in a predetermined ratio for dispensing, the dispenser comprising a dispenser housing with at least two flexible containers (14, 16) that are received in the dispenser housing and of which at least one is flexible for separate storing of the substances to be dispensed which are dispensable through a respective dispensing opening (26, 28) to a dispensing head (30), wherein the substance is dispensable from at least one of the containers by pressure loading, wherein the dispensing is performed either by manual pressure loading through the dispenser housing upon at least one of the containers (14, 16) received in the dispenser (10) and/or by a propellant fluid that is arranged in the dispenser housing (12) which loads at least one of the containers to dispense the substance,
characterized in that
a respective constant amount pump (58) is provided between the dispensing openings (26, 28) of the containers (14, 16) and the dispensing head (30) for each substance that is fed through the corresponding dispensing opening, wherein the constant amount pump dispenses an exact amount of the substance to the dispensing head (30) independently from viscosity variations of one or plural substances respectively corresponding to a predetermined mixing ratio and that the constant amount pumps (58) of the individual substances are coupled with each other mechanically and/or magnetically, further characterized in that
the dispenser housing (12) includes at least two output openings (26, 28) wherein at least two of the constant amount pumps (58) are provided which are arranged in a common pump housing (42) which includes at least two further pump chambers (70, 72) respectively with each of the at least two constant amount pumps (58).

19. The dispenser according to claim 18,
characterized in that
the pump housing (42) includes two pump chambers that are separated by a divider wall (50) wherein a respective constant amount pump (58) is arranged in each pump chamber, that a dispensing opening (26, 28) opens into each pump chamber (52, 54) wherein the substance is feedable to the pump through the dispensing opening.

20. The dispenser according to claim 18,
characterized in that
an outlet channel is provided on an outlet side of the pump, configured as a tubular spout (48) wherein the outlet channel leads to the dispensing head (30) and in which either both volume flows of both substances are mixed or both volume flows are conductible to the dispensing head (30) separately from each other due to a divider element for dispensing the substances.

* * * * *